US007871110B2

United States Patent
Østergaard et al.

(10) Patent No.: US 7,871,110 B2
(45) Date of Patent: Jan. 18, 2011

(54) SEALING ELEMENT AND A COUPLING DEVICE AND A VALVE DEVICE PROVIDED WITH SUCH A SEALING ELEMENT

(75) Inventors: Inge Østergaard, Heggedal (NO); Erik Raad, Oslo (NO); Staale Svindland, Oslo (NO)

(73) Assignee: Vetco Gray Scandinavia AS, Sandvika (NO)

( * ) Notice: Subject to any disclaimer, the term of this patent is extended or adjusted under 35 U.S.C. 154(b) by 712 days.

(21) Appl. No.: 10/565,437

(22) PCT Filed: Jul. 20, 2004

(86) PCT No.: PCT/IB2004/002334

§ 371 (c)(1),
(2), (4) Date: Jan. 20, 2006

(87) PCT Pub. No.: WO2005/008105

PCT Pub. Date: Jan. 27, 2005

(65) Prior Publication Data

US 2006/0197339 A1 Sep. 7, 2006

(30) Foreign Application Priority Data

Jul. 21, 2003 (NO) .................................. 20033278

(51) Int. Cl.
*F16L 17/06* (2006.01)
*F16L 17/08* (2006.01)

(52) U.S. Cl. .......................... 285/109; 285/31; 285/100; 285/101; 285/229; 285/334.2

(58) Field of Classification Search ................... 285/31, 285/100, 101, 109, 225, 226, 229, 370, 397, 285/334.2; 277/604, 607, 626, 634, 636, 277/644

See application file for complete search history.

(56) References Cited

U.S. PATENT DOCUMENTS

| 48,709 | A | * | 7/1865 | Emory | 258/251 |
|---|---|---|---|---|---|
| 511,937 | A | * | 1/1894 | Decarie | 285/332.4 |
| 1,073,850 | A | * | 9/1913 | Greer | 285/109 |
| 1,665,810 | A | * | 4/1928 | Gillick | 285/109 |
| 2,306,702 | A | * | 12/1942 | Koerner | 285/226 |
| 2,470,359 | A | * | 5/1949 | McLean | 285/109 |
| 3,420,497 | A | | 1/1969 | Wilcox | |
| 4,072,329 | A | * | 2/1978 | Mutchler | 285/187 |

(Continued)

FOREIGN PATENT DOCUMENTS

EP 0040268 B1 11/1981

(Continued)

*Primary Examiner*—James M Hewitt
(74) *Attorney, Agent, or Firm*—Venable LLP; Eric J. Franklin

(57) ABSTRACT

A sealing element that includes a hollow body of metallic material and first and second male sealing members formed at a respective end of the body. The respective male sealing member has an external spherical contact surface designed for mating with a corresponding internal conical contact surface of a female sealing member so as to form a fluid-tight seal between the male sealing member and the female sealing member when their contact surfaces are pressed against each other. Also, a coupling device and a valve device provided with the sealing element.

16 Claims, 8 Drawing Sheets

U.S. PATENT DOCUMENTS

| | | |
|---|---|---|
| 4,087,323 A | 5/1978 | Sullivan et al. |
| 4,132,386 A | 1/1979 | Lee |
| 4,186,949 A * | 2/1980 | Bartha et al. ................ 285/226 |
| 4,293,152 A * | 10/1981 | Berghofer ................... 285/229 |
| 4,765,660 A * | 8/1988 | Maier ......................... 285/229 |
| 4,798,492 A * | 1/1989 | Smith ......................... 403/223 |
| 5,284,367 A * | 2/1994 | Yano ........................... 285/51 |
| 5,320,133 A | 6/1994 | Nimberger |
| 5,379,798 A | 1/1995 | Syljeset et al. |
| 5,507,535 A * | 4/1996 | McKamey et al. ....... 285/149.1 |
| 5,950,985 A | 9/1999 | Petterson |
| 2004/0032123 A1 * | 2/2004 | Chu .......................... 285/223 |

FOREIGN PATENT DOCUMENTS

| | | |
|---|---|---|
| EP | 1035365 B1 | 9/2000 |
| EP | 1291491 A2 | 3/2003 |
| GB | 2013810 A | 8/1979 |
| GB | 2293221 A | 3/1996 |
| WO | WO 9307414 A1 | 4/1993 |

* cited by examiner

SEALING ELEMENT AND A COUPLING DEVICE AND A VALVE DEVICE PROVIDED WITH SUCH A SEALING ELEMENT

CROSS-REFERENCE TO RELATED APPLICATIONS

The present invention claims priority from Norwegian patent application 20033278 filed 21 Jul. 2003 and is the National Phase application under 35 U.S.C. §371 of PCT/IB2004/002334.

FIELD OF THE INVENTION AND PRIOR ART

The present invention relates to a sealing element, a coupling device provided with such a sealing element and a valve device provided with such a sealing element.

In this description and the subsequent claims, the term "fluid" refers to a flowing medium in gaseous or liquid form. Consequently, the expression "fluid-tight seal" implies a seal that is liquid-tight as well as gas-tight.

Development within offshore oil and gas exploration in the recent years has been directed to subsea installations for processing and transport of oil and gas. These subsea installations replace the traditional platforms, where oil and gas are transported up to the platform for further processing and transport. This development of subsea production, processing and transport systems has resulted in an increasing need for subsea coupling and sealing elements, e.g. for coupling together conduits belonging to interconnectable processing modules in a fluid-tight manner. It has been realised that seals based on corrosion resistant metallic materials are more suitable than conventional elastomer seals for use in subsea applications. It has further been experienced that elastomer seals have shown signs of degeneration in course of time due to ageing, which may result in loss of flexibility and/or cause water ingress. This problem is eliminated by the use of a metal seal.

A coupling device for subsea use is previously known from GB 2293221 A. This coupling device comprises a male coupling part, a corresponding female coupling part and an intermediate metal seal. The metal seal is preloaded by urging said coupling parts against each other. The male coupling part is provided with two projections which fit into helical grooves in the female coupling part, and the coupling parts are urged towards each other by a rotation of the male coupling part in relation to the female coupling part. This construction puts high demands on the tolerances and the alignment of the coupling parts and is therefore costly to manufacture and also rather complicated to assemble.

SUMMARY OF THE INVENTION

A first object of the present invention is to provide a sealing element making possible a reliable sealing between two interconnectable parts with relatively low requirements with respect to relative tolerances and alignment.

According to the invention, this object is achieved by a sealing element. The sealing element according to the invention constitutes a metal seal which is capable of providing a reliable sealing effect even when the interconnecting sealing members are somewhat out of alignment with each other. Furthermore, by having spherical contact surfaces and corresponding conical contact surfaces, the tolerance requirements of the interconnecting members are relatively low compared to the state-of-the-art systems.

According to a preferred embodiment of the invention, the body of the sealing element is provided with an intermediate member, which forms a continuous part together with the first and second male sealing members and which is mechanically compressible so as to be capable to store elastic energy when the body is subjected to axial compression, the internal bore of said body extending through said intermediate member. Hereby, the sealing element is, when it is fitted between the female sealing members, able to store elastic energy as the female sealing members are mutually pressed towards each other in order to form fluid-tight seals between the female sealing members and the corresponding male sealing members, which allows for larger tolerances in the axial positioning of the female sealing members and the forces exerted in the interconnection of the sealing members.

According to another preferred embodiment of the invention, the intermediate member is expandable by an internal fluid pressure in the body so as to urge the respective male sealing member outwards in the axial direction of the body against the corresponding female sealing member when the sealing element is fitted between said female sealing members, thereby increasing the sealing contact pressure between the respective male sealing member and the corresponding female sealing member.

A second object of the present invention is to provide a coupling device making possible a simple interconnection of two female coupling parts with relatively low requirements with respect to tolerances and mutual alignment, while offering a reliable sealing between the two female coupling parts.

According to the invention, this object is achieved by a coupling device having the features of claim 7. In the inventive coupling device, two female coupling parts are connected to each other via an intermediate male coupling part in the form of a sealing element of the above-indicated type. Hereby, the two female coupling parts may remain fixed to the associated equipment, such as two interconnected subsea processing units, while removing the male coupling part for replacement or maintenance. When the coupling device is assembled, i.e. when the coupling parts are pressed against each other, the mutually contacting sealing members form metal seals which are capable of providing a reliable sealing effect even when the coupling parts and the associated sealing members are somewhat out of alignment with each other. Furthermore, by having spherical contact surfaces and corresponding conical contact surfaces, the tolerance requirements of the coupling parts and the associated sealing members are relatively low compared to the state-of-the-art systems. The coupling device according to the present invention also essentially facilitate the simultaneous connection of two or more coupling devices in a multi-bore arrangement.

A preferred embodiment of the inventive coupling device is characterized in:

that at least one of the first and second female coupling parts is provided with a valve, which comprises a valve body displaceably arranged inside the internal bore of the female coupling part and a spring member acting on the valve body, the valve body being displaceable against the action of the spring member from a first position, in which the valve is closed and prevents fluid flow through the internal bore of the female coupling part, to a second position, in which the valve is open and allows fluid flow through the internal bore of the female coupling part, and that the male coupling part is provided with an actuation member for displacing the valve body from said first position to said second position immediately before the female sealing member of the female coupling part is brought into engagement with the corresponding male sealing member of the male coupling part.

Hereby, the internal bore of the respective female coupling part is automatically opened, so as to allow for an internal flow of fluid through the coupling device, when the seal between the associated female sealing member and the corresponding male sealing member is established as the female coupling part and the male coupling part are mutually displaced into contact with each other. Likewise, the internal bore of the respective female coupling part is automatically closed when the seal between the associated female sealing member and the corresponding male sealing member is broken as the female coupling part and the male coupling part are mutually displaced out of contact with each other, e.g. in connection with a removal of the male coupling part for replacement or maintenance.

According to another preferred embodiment of the inventive coupling device, the valve comprises a housing which is immovably fixed inside the internal bore of the female coupling part, said housing being provided with a cavity accommodating the spring member and a part of the valve body, said cavity being in fluid communication with an orifice at the end of the valve facing the free end of the female sealing member of the female coupling part so as to allow the cavity to be in fluid communication with the surroundings via said orifice when the female coupling part is out of engagement with the male coupling part. Hereby, said cavity will have an internal pressure corresponding to the external pressure of the surrounding medium, given that the internal and external pressure respectively are effecting a cross sectional area having the same size, which implies that the valve will be pressure balanced and insignificantly sensitive to differences between the pressure of the fluid in the internal bore and the pressure of the surrounding medium, which reduces the risk of troubles in connection with the actuation of the valve during interconnection or disconnection of the coupling parts. When the coupling device is used in a subsea installation, said cavity will be filled with seawater of the same pressure as the surrounding seawater.

According to another preferred embodiment of the inventive coupling device, the actuation member of the male coupling part is adapted to restrict the flow through the orifice when the female sealing member is in engagement with the corresponding male sealing member. Hereby, the fluid in the cavity accommodating the spring member will be prevented from mixing with the fluid flowing through the coupling device when the coupling device is assembled.

According to another preferred embodiment of the inventive coupling device, said cavity is in fluid communication with the orifice via a channel extending through the valve body, and the actuation member is adapted to engage with the valve body so as to cover the orifice and thereby restrict the flow through the orifice when the female sealing member is in engagement with the corresponding male sealing member. Hereby, the actuation member will automatically restrict the flow of fluid into and out of the cavity when the coupling device is assembled.

According to another preferred embodiment of the inventive coupling device, the valve is provided with a ring-shaped seal element arranged in an annular groove, which groove is provided in the inner wall of the internal bore of the female coupling part, an external surface of the valve body being adapted to engage with the ring-shaped seal element so as to form a fluid-tight seal between the inner wall of the internal bore and the valve body when the valve body is in said first position. Hereby, the internal bore of the female coupling part is sealed from the surroundings in a simple and efficient manner when the coupling device is disassembled.

Another preferred embodiment of the inventive coupling device is characterized in:

that the valve body comprises a first body part and a second body part, said first body part being located in front of the second body part as seen in a direction along the associated internal bore towards the associated female sealing member, that a first flow path section is provided radially outwardly of the first body part between the valve housing and the inner wall of the internal bore, and a second flow path section is provided between the second body part and said inner wall, said first and second flow path sections extending essentially in the axial direction of the internal bore on mutually different levels as seen in the radial direction of the internal bore, that the first flow path section is connected to the second flow path section via an intermediate flow path section extending obliquely in relation to the first and second flow path sections, and that the first body part is adapted to block the intermediate flow path section when the valve body is displaced from said second position to said first position.

Hereby, the valve body will not be subjected to any axial forces by the fluid inside the internal bore of the female coupling part acting against the displacement of the valve body from said first position to said second position, which will facilitate the displacement of the valve body in connection with the interconnection of the coupling parts.

Another preferred embodiment of the inventive coupling device is characterized in that the second body part has a smaller cross-sectional area than the first body part, that the second body part is surrounded by the ring-shaped seal element and out of engagement therewith when the valve body is in said second position, that an external surface of the first body part is adapted to be brought into engagement with the ring-shaped seal element so as to form a fluid-tight seal between the inner wall of the internal bore and the valve body when the valve body is displaced from said second position to said first position, and that the end of the first body part facing the second body part only has blunt edges so that the ring-shaped seal element will meet no sharp edge when the valve body is displaced between said positions. Hereby, the ring-shaped seal element will only be subjected to minor wear by the valve body during the displacement of the valve body between said positions.

A third object of the present invention is to provide a valve device offering a reliable sealing between two valve parts with relatively low requirements with respect to tolerances.

According to the invention, this object is achieved by a valve device. In the inventive coupling device, two valve parts are connected to each other via an intermediate sealing element of the above-indicated type. When the two valve parts are pressed against each other, the mutually contacting sealing members form metal seals which are capable of providing a reliable sealing effect. By having spherical contact surfaces and corresponding conical contact surfaces, the tolerance requirements of the two valve parts and the associated sealing members are relatively low compared to the state-of-the-art systems.

Further advantages as well as advantageous features of the sealing element, the coupling device and the valve device according to the present invention will appear from the following description and the dependent claims.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
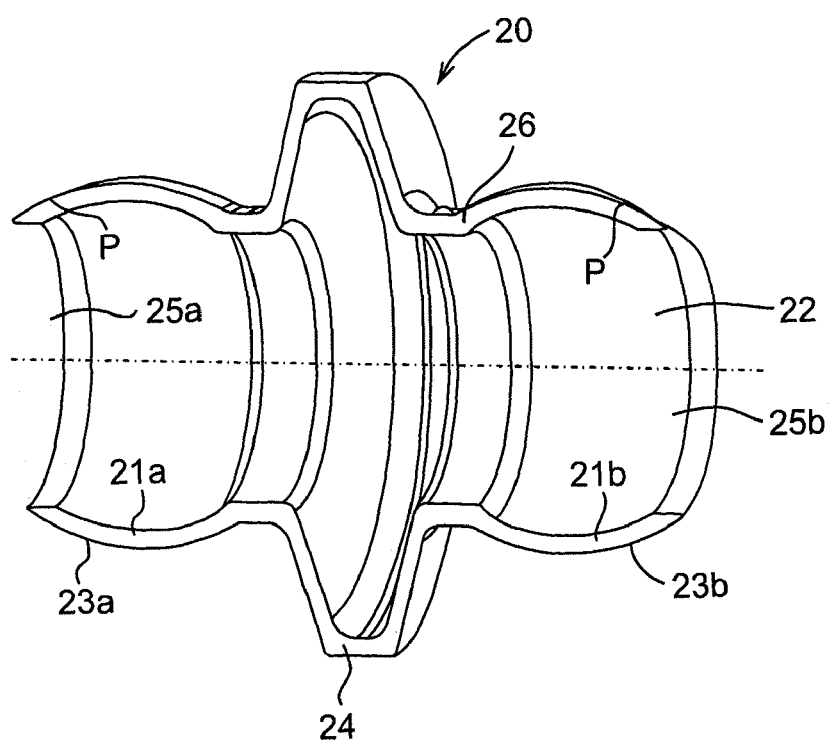
FIG. 1 is a schematical illustration of a sealing element according to the invention as seen in a longitudinal section.

A sealing element 20 according to the present invention is illustrated in FIG. 1. The sealing element comprises a hollow, essentially tube-shaped body 26 of metallic material. A first male sealing member 21a is formed at a first end of the body 26. Said first male sealing member 21a has an external spherical contact surface 23a designed for mating with a corresponding internal conical contact surface of a first female sealing member so as to form a fluid-tight seal between the first male sealing member and the first female sealing member when their contact surfaces are pressed against each other. A second male sealing member 21b is formed at a second end of the body 26 opposite said first end. Said second male sealing member 21b has an external spherical contact surface 23b designed for mating with a corresponding internal conical contact surface of a second female sealing member so as to form a fluid-tight seal between the second male sealing member and the second female sealing member when their contact surfaces are pressed against each other. An internal bore 22 extends through the body 26 and through the first and second male sealing members 21a, 21b. The internal bore 22 ends at openings 25a, 25b provided at the respective outer end of the male sealing members 21a, 21b. Consequently, the first male sealing member 21a is connected to the second male sealing member 21b via the internal bore 22. The spherical contact surface 23a, 23b of the respective male sealing member 21a, 21b is designed to surround said internal bore 22. The contact surfaces 23a, 23b are to be of metallic material, preferably corrosion resistant metallic material, and the body 26 and the male sealing members 21a, 21b are preferably formed in one piece. The male sealing members 21a, 21b are here coaxial with each other.

The body 26 is provided with a flexible intermediate member 24, which forms a continuous part together with the first and second male sealing members 21a, 21b and which is mechanically compressible so as to be capable to store elastic energy when the body 26 is subjected to axial compression. The internal bore 22 of the sealing element 20 extends through said intermediate member 24. The intermediate member 24 has an internal cross-sectional area which is larger than the external cross-sectional area of the respective male sealing member 21a, 21b as seen at the point P of the male sealing member where the male sealing member is designed to engage with the corresponding female sealing member. Hereby, the intermediate member 24 is expandable in the axial direction of the sealing element 20 by an internal fluid pressure in the sealing element, i.e. a fluid pressure inside the internal bore 22, so as to urge the respective male sealing member 21a, 21b against the corresponding female sealing member when the sealing element 20 is fitted between said female sealing members, thereby increasing the sealing contact pressure between the respective male sealing member and the corresponding female sealing member. The intermediate member 24 is suitably of metallic material and is preferably formed in one piece with the rest of the body 26. The intermediate member 24 is preferably essentially shaped as a single or multiple wave bellows. In the illustrated embodiment, the intermediate member is shaped as a single wave bellows. It is realised that the intermediate member 24 should have a wall thickness thin enough to give the intermediate member 24 the desired mechanical stiffness so as to allow for the axial compressions and expansions thereof, still maintaining safe allowable stresses and deflections.

The sealing element 20 is intended to be fitted between two parts of for instance a coupling device or a valve device so as to allow said parts to be connected to each other in a fluid-tight manner, as will be more closely described below with reference to FIGS. 2-9.

Figure 2:
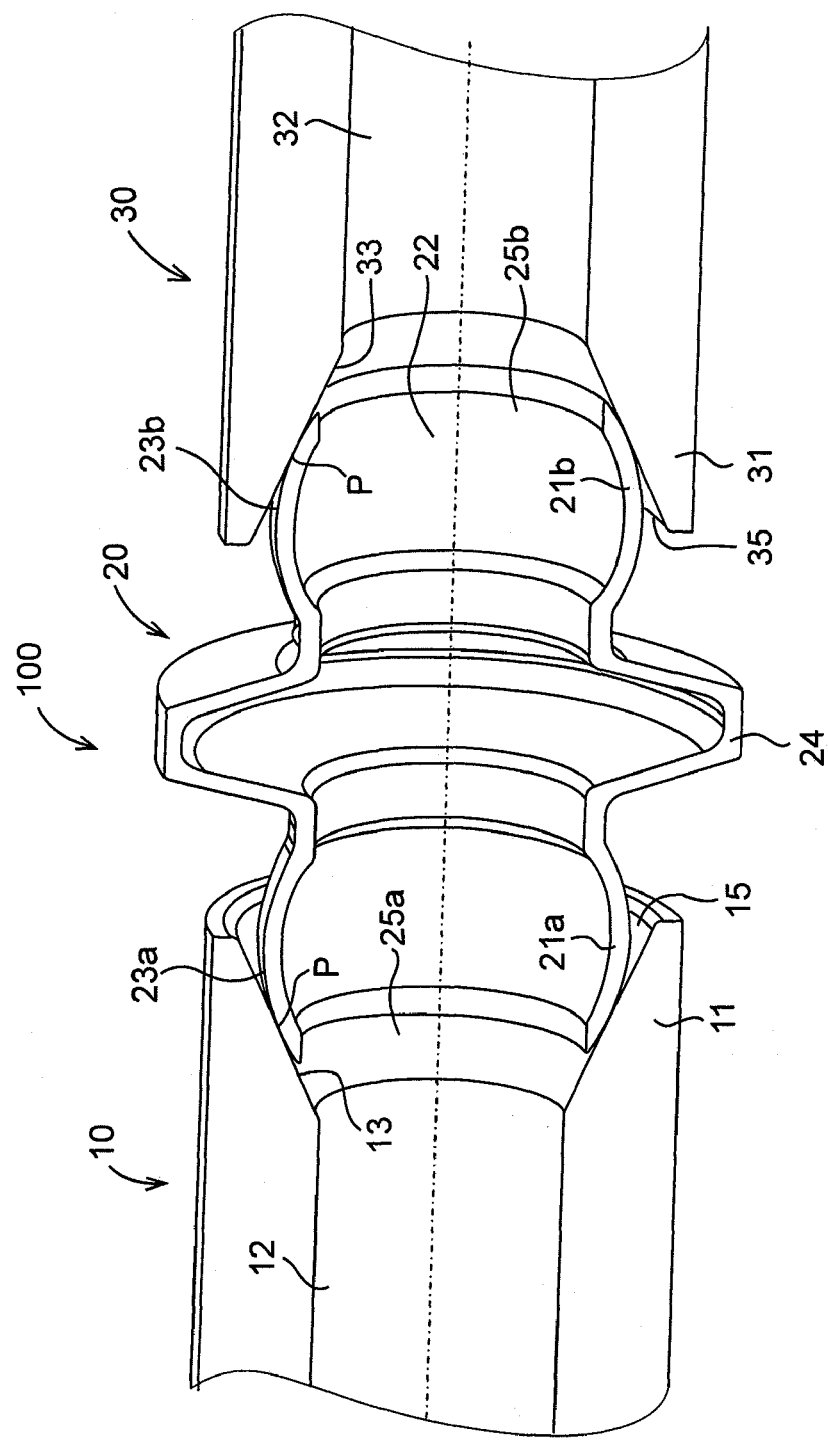
FIG. 2 is a schematical illustration of a first embodiment of a coupling device according to the invention as seen in a longitudinal section.

A first embodiment of a coupling device 100 according to the present invention is illustrated in FIG. 2. This coupling device comprises a first female coupling part 10, which is provided with a first female sealing member 11 and has an internal bore 12 extending through the coupling part 10 and the female sealing member 11, and a second female coupling part 30, which is provided with a second female sealing member 31 and has an internal bore 32 extending through the coupling part 30 and the female sealing member 31. The internal bore 12, 32 of the respective female coupling part 10, 30 ends at an opening 15, 35 provided at the outer end of the associated female sealing member 11, 31. The respective female coupling part 10, 30 is here tube-shaped. The coupling device 100 further comprises a male coupling part 20 in the form of a sealing element of the type described above with reference to FIG. 1. The male coupling part 20 is consequently provided with a first male sealing member 21a at a first end thereof and a second male sealing member 21b at a second end thereof. The male coupling part 20 has an internal bore 22 extending through the coupling part 20 and its sealing members 21a, 21b.

The male sealing members 21a, 21b are each provided with an external spherical contact surface 23a, 23b of metallic material and the female sealing members 11, 31 are each provided with a corresponding internal conical contact surface 13, 33 of metallic material for engagement with the spherical contact surface 23a, 23b of the corresponding male sealing member 21a, 21b. The respective spherical contact surface 23a, 23b of the male sealing members 21a, 21b and the conical contact surface 13, 33 of the corresponding female sealing member 11, 31 are designed to form a fluid-tight seal between the male coupling part 20 and the corresponding female coupling part 10, 30 when said contact surfaces 23a, 13 and 23b, 33 are pressed against each other. It is realised that the contact surfaces 13, 23a, 23b, 33 should have a suitable surface smoothness, and may have a thin layer of metal coating, galvanically applied, to improve surface finishing, so as to allow a fluid-tight contact between said contact surfaces. The respective contact surface 13, 23a, 23b, 33 is suitably of a corrosion resistant metallic material.

When the respective pair of sealing members 11, 21a and 31, 21b are pressed against each other so as to form a seal between the male sealing member 21a, 21b and the corresponding female sealing member 11, 31, said internal bores 12, 22, 32 will be interconnected so as to allow an internal flow of fluid through the coupling parts 10, 20, 30. The internal flow channel formed by these internal bores 12, 22, 32 will consequently be sealed from the surroundings by the seal formed between the respective pair of sealing members. The female coupling parts 10, 30 are e.g. intended to be connected to a respective fluid carrying conduit, so as to allow for an interconnection of these conduits.

Figure 4:
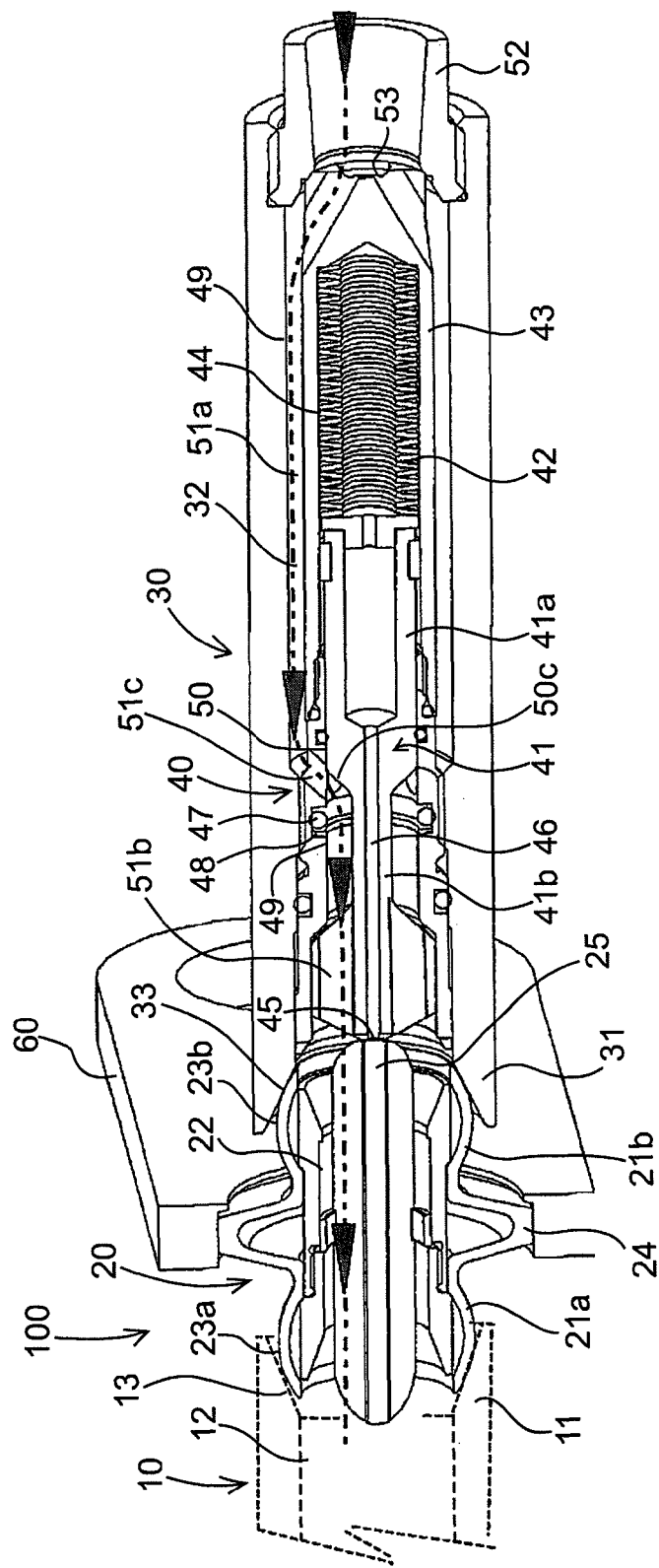
FIG. 4 is a schematical illustration of a second embodiment of a coupling device according to the invention as seen in a longitudinal section, with the valve of the female coupling part in an open position.

At least one of the female coupling parts 10, 30 is displaceable in the axial direction towards and away from the opposite female coupling part 30, 10 so as to make possible the assembling and disassembling of the coupling device. When the coupling device is to be assembled, the male coupling part 20 is located in the area between the female coupling parts 10, 30, whereupon the female coupling parts 10, 30 are mutually displaced towards each other so as to clamp the male coupling part between them and establish the required sealing contact pressure between the respective male sealing member and the corresponding female sealing member. The female coupling parts are then secured in relation to each other. This displacing and securing of the female coupling parts may be accomplished by any suitable means. It is realised that the coupling device is disassembled in the opposite order. During the operations of assembling and disassembling, the male coupling part 20 is suitably held in place axially by means of a suitable holder 60 (retainer plate), as illustrated in FIG. 4. The male coupling part 20 may be independently retrieved, i.e. without having to retrieve either of the female coupling parts 10, 30.

Figure 3:
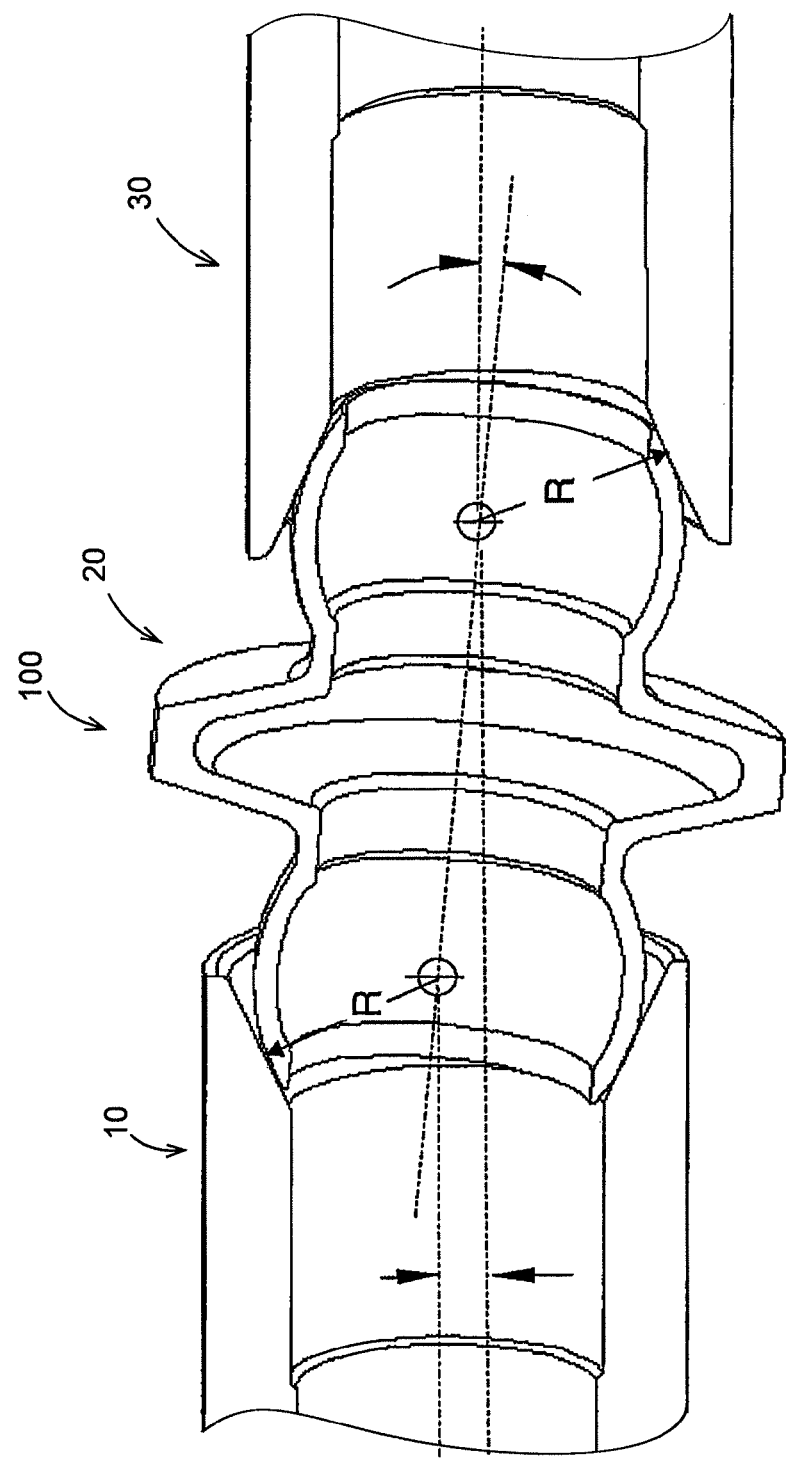
FIG. 3 is a schematical illustration of the coupling device of FIG. 2, with the female coupling parts out of alignment with each other.

FIG. 2 illustrates the coupling device with the female coupling parts 10, 30 arranged in alignment with each other and connected to each other via the male coupling part 20. In this embodiment, the male sealing members 21a, 21b are essentially coaxial with each other. Owing to the shape of the sealing members 11, 21a, 21b, 31, the illustrated coupling device 100 may also be used for interconnecting two female coupling parts 10, 30 that are somewhat out of alignment with each other, as illustrated in FIG. 3.

In the illustrated embodiment, the first male sealing member 21a Is connected to the second male sealing member 21b via an intermediate member 24 of the type described above with reference to FIG. 1, which is mechanically compressible so as to be capable to store elastic energy when the male coupling part 20 is subjected to compression between the first female coupling part 10 and the second female coupling part 30. The intermediate member 24 has an internal cross-sectional area which is larger than the external cross-sectional area of the respective male sealing member 21a, 21b as seen at the point P of the male sealing member where the male sealing member engages with the corresponding female sealing member 11, 31. Hereby, the intermediate member 24 is expandable in the axial direction of the male coupling part 20 by an internal fluid pressure in the coupling device 100, i.e. a fluid pressure inside the internal bore 22, so as to urge the respective male sealing member 21a, 21b against the corresponding female sealing member 11, 31, thereby increasing the sealing contact pressure between the respective male sealing member and the corresponding female sealing member.

According to an alternative, here not illustrated, embodiment, only one of the first and second female coupling parts has an internal bore extending through the coupling part and its female sealing member, whereas the other female coupling part is designed as a stop member adapted to close the internal bore 22 of the male coupling part 20 when the male coupling part is clamped between the first and second female coupling parts 10, 30. Said other female coupling part is consequently not provided with any internal bore of the above-indicated type. Said other female coupling part may for instance be designed as an end cap that is to be pressed against the male coupling part 20 so as to stop fluid flow through the internal bores of the opposite female coupling part and the male coupling part 20.

Figure 5:
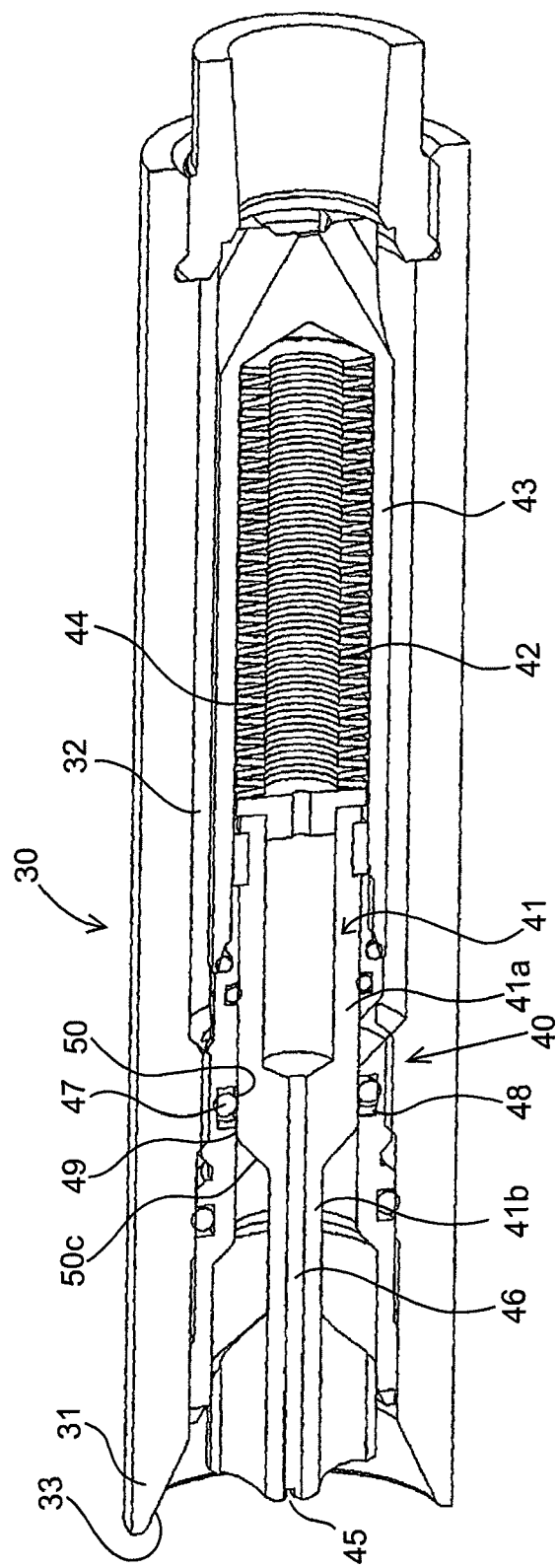
FIG. 5 is a schematical illustration of the female coupling part of FIG. 4, with the valve of the female coupling part in a closed position.

According to a preferred embodiment of the invention, the coupling device 100 is provided with valve means for automatically closing the internal bores 12, 32 of the female coupling parts 10, 30 when the male coupling part 20 is brought out of engagement with the female coupling parts and automatically opening said internal bores when the male coupling part is brought into engagement with the female coupling parts. A preferred embodiment of such valve means is illustrated in FIGS. 4 and 5. Alternatively, the valve means may be of the type disclosed in GB 2293221 A. In FIGS. 4 and 5, only the valve of one of the female coupling parts 10, 30 is shown. However, it should be understood that both female coupling parts could be provided with identical valves.

In the embodiment illustrated in FIGS. 4 and 5, the respective female coupling part 10, 30 is provided with a valve 40, which comprises a valve body 41 displaceably arranged inside the internal bore 32 of the female coupling part and a spring member 42 acting on the valve body. The valve body 41 is displaceable against the action of the spring member 42 from a first position, in which the valve is closed and prevents fluid flow through the internal bore 32 of the female coupling part, to a second position, in which the valve is open and allows fluid flow through the internal bore of the female coupling part. The male coupling part 20 is provided with an actuation member 25 for displacing the valve body 41 from said first position to said second position immediately before the female sealing member 11, 31 of the female coupling part 10, 30 is brought into engagement with the corresponding male sealing member 21a, 21b of the male coupling part 20. The actuation member 25 consists of a body fixed inside the internal bore 22 of the male coupling part, while allowing fluid to pass through the body 25 via axial openings in the body 25 and/or via areas between the external surface of the body 25 and the inner wall of the bore 22. The actuation member 25 displaces the valve body 41 simply by pushing it inwards in the internal bore 32 of the female coupling part as the actuation member is moved towards the female coupling part together with the male coupling part.

The valve 40 comprises a housing 43 which is fixed, i.e. immovable mounted, inside the internal bore 32 of the female coupling part 30 by means of a fastening element 52, which is secured to the rear end of the housing 43 via a hub 53 and secured inside the bore 32. The fastening element 52 is tube-shaped so as to allow fluid to pass through it. The housing 43 is immovably fixed inside the internal bore 32 so as to be immovable in relation to the internal bore 32. The housing 43 has a cylindrically shaped front part with an opening at the forward end so as to form a cavity 44, which accommodates the spring member 42 and a rear part of the valve body 41. The valve body 41 forms a piston slidingly received in the cylindrical part of the housing 43. The spring member 42 is fixed between the rear end of the cavity 44 and the rear end of the valve body 41 so as to urge the valve body forward in the direction towards the free end of the female coupling part. The cavity 44 is in fluid communication with an orifice 45 at the end of the valve facing the free end of the female coupling part so as to allow the cavity to be in fluid communication with the surroundings via said orifice when the female coupling part 30 is out of engagement with the male coupling part 20. The cavity 44 is in fluid communication with the orifice 45 via a channel 46 extending axially through the valve body 41.

The actuation member 25 is adapted to restrict the flow through the orifice 45 when the female sealing member 31 is in engagement with the corresponding male sealing member 21b. In the illustrated embodiment, this is accomplished in that the actuation member 25 is adapted to engage with the valve body 41 so as to cover the orifice 45 and thereby restrict the flow through the orifice when the female sealing member 31 is in engagement with the corresponding male sealing member 21b.

In the embodiment illustrated in FIGS. 4 and 5, the valve body 41 comprises a first body part 41a and a second body part 41b, said first body part 41a being located in front of the second body part 41b as seen in a direction along the internal bore 32 towards the female sealing member 31, i.e. towards the free end of the female coupling part 30. In FIG. 4, the flow path through the second female coupling part 30 is illustrated in a broken line. A first flow path section 51a is provided radially outwardly of the first body part 41a between the valve housing 43 and the inner wall 49 of the internal bore 32, and a second flow path section 51b is provided between the second body part 41b and said inner wall 49, said first and second flow path sections 51a, 51b extending essentially in the axial direction of the internal bore 32 on mutually different levels as seen in the radial direction of the internal bore. The first flow path section 51a is connected to the second flow path section 51b via an intermediate flow path section 51c extending obliquely in relation to the axial direction of the internal bore 32 and thereby obliquely to the first and second flow path sections 51a, 51b. The first body part 41a is adapted to allow fluid flow through the intermediate flow path section 51c when the valve body 41 is in its retracted second position, as illustrated in FIG. 4, and to block the intermediate flow path section 51c when the valve body 41 is displaced from said second position to its advanced first position, as illustrated in FIG. 5. The intermediate flow path section 51c is defined partly by an external surface 50c of the valve body 41 which extends obliquely, as seen in the axial direction of the valve body 41, between the first body part 41a and the second body part 41b.

The valve 40 is provided with a ring-shaped seal element 47 arranged in an annular groove 48 provided in the inner wall 49 of the internal bore 32. An external surface 50 of the first part 41a of the valve body is adapted to engage with the seal element 47 so as to form a fluid-tight seal between the inner wall 49 of the internal bore 32 and the valve body 41 when the valve body is in its advanced first position, as illustrated in FIG. 5. The second body part 41b has a smaller cross-sectional area than the first body part 41a and is surrounded by the seal element 47 and out of engagement therewith when the valve body is in said second position, as illustrated in FIG. 4. The external surface of the first body part 41a is adapted to be brought into engagement with the seal element 47 so as to form said fluid-tight seal when the valve body is displaced from said second position to said first position. In order to reduce wear on the seal element 47, the end of the first body part 41a facing the second body part 41b only has blunt edges so that the seal element 47 will meet no sharp edge when the valve body is displaced between said positions.

The coupling device 100 of the present invention is suitable for use as a hydraulic subsea coupling, e.g. for coupling together conduits belonging to interconnectable processing modules in a fluid-tight manner. It should, however, be evident to a person skilled in the art that the sealing element and the coupling device according to the present invention may be used for many other purposes and in many other applications where a flexible and fluid-tight seal is required.

From FIG. 4 which shows the valve of the female coupling part in an open position and FIG. 5 which shows the valve of the female coupling part in a closed position, it is realized that the coupling device according to the present invention makes use of radial sealings for opening and closing of the flowing through of fluid.

Figure 6:
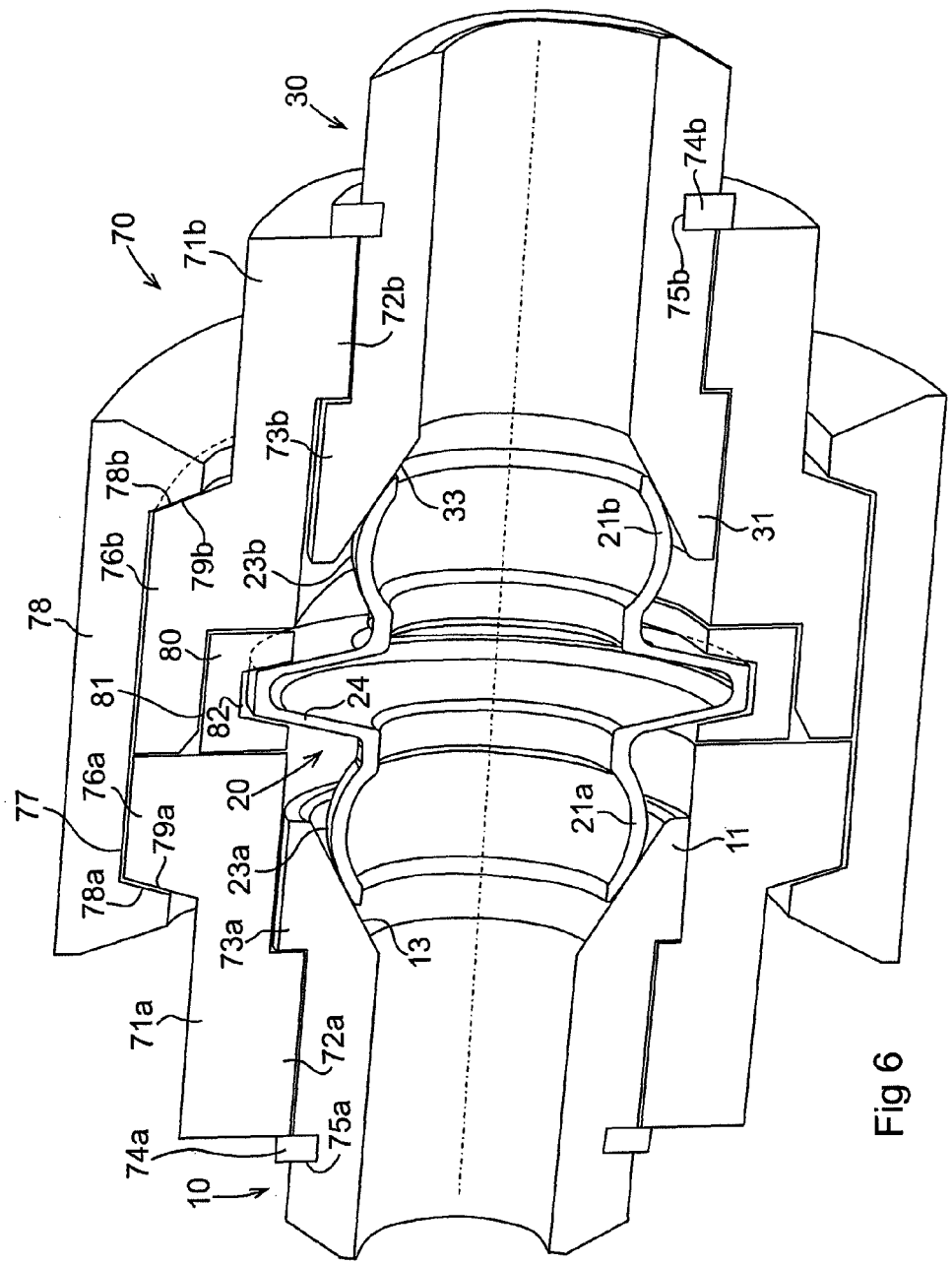
FIG. 6 is a schematical illustration of a third embodiment of a coupling device according to the invention as seen in a longitudinal section.

An alternative embodiment of a coupling device according to the present invention is illustrated in FIG. 6. This coupling device comprises two female coupling parts 10, 30, an intermediate male coupling part 20 in the form of a sealing element of the type described above with reference to FIG. 1 and associated sealing members 11, 21a, 21b, 31 with contact surfaces 13, 23a, 23b, 33 of the configurations described with reference to FIGS. 1-3. The coupling device is here provided with a clamping arrangement 70 for securing the two female coupling parts 10, 30 in relation to each other with the male coupling part 20 clamped between them. The clamping arrangement 70 comprises a first flange ring 71a and a second flange ring 71b. The first flange ring 71a is secured on the outside of the first female coupling part 10 in engagement with the external wall thereof. The flange ring 71a comprises an inwardly protruding part 72a which is received between a flange 73a surrounding the outer free end of the coupling part 10 and a retaining ring 74a arranged in a groove 75a in the external wall of the coupling part 10. The second flange ring 71b is secured on the outside of the second female coupling part 30 in engagement with the external wall thereof. The flange ring 71b comprises an inwardly protruding part 72b which is received between a flange 73b surrounding the outer free end of the coupling part 30 and a retaining ring 74b arranged in a groove 75b in the external wall of the coupling part 30. The respective flange ring 71a, 71b is provided with an outwardly protruding part 76a, 76b received in an annular recess 77 of a clamp shell 78. The clamp shell 78 is arranged to surround the protruding parts 76a, 76b of the flange rings 71a, 71b. The flange rings 71a, 71b are forced towards each other by pressing the clamp shell inwards, due to the engagement between the inclined side walls 78a, 78b of the recess 77 and the corresponding inclined side walls 79a, 79b of the protruding parts 76a, 76b. The clamping arrangement 70 also comprises a seal retainer plate 80 received inside a recess 81 formed between the first flange ring 71a and the second flange ring 71b. The seal retainer plate 80 is provided with an annular inner recess 82 surrounding the intermediate member 24 of the male coupling part 20 and accommodating the outer edge of the bellows of said intermediate member 24.

Figure 7:
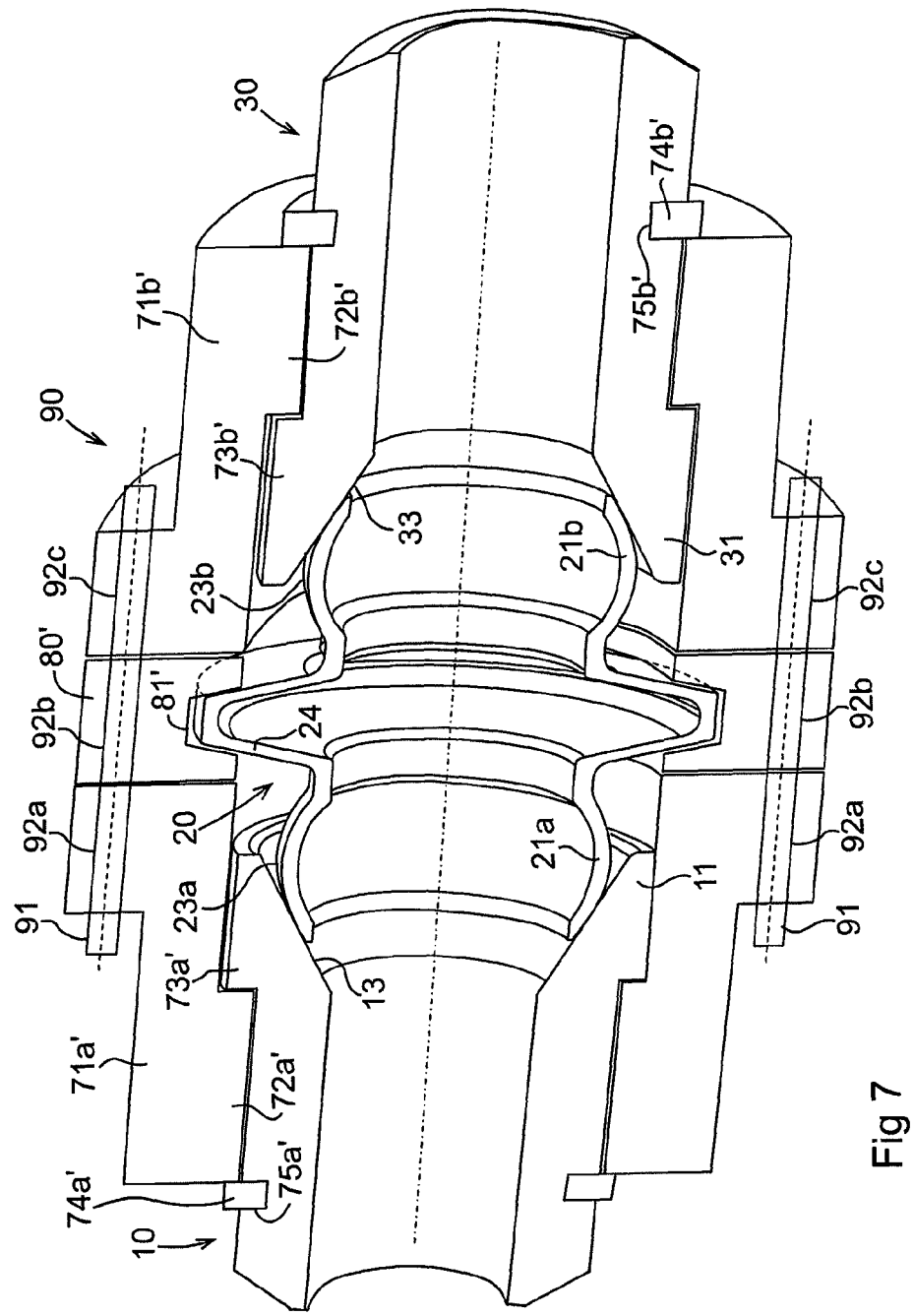
FIG. 7 is a schematical illustration of a fourth embodiment of a coupling device according to the invention as seen in a longitudinal section.

Another alternative embodiment of a coupling device according to the present invention is illustrated in FIG. 7. This coupling device comprises two female coupling parts 10, 30, an intermediate male coupling part 20 in the form of a sealing element of the type described above with reference to FIG. 1 and associated sealing members 11, 21a, 21b, 31 with contact surfaces 13, 23a, 23b, 33 of the configurations described with reference to FIGS. 1-3. The coupling device is here provided with a bolted securing arrangement 90 for securing the two female coupling parts 10, 30 in relation to each other with the male coupling part 20 clamped between them. The clamping arrangement 90 comprises a first flange ring 71a' and a second flange ring 71b'. The first flange ring 71a' is secured on the outside of the first female coupling part 10 in engagement with the external wall thereof. The flange ring 71a' comprises an inwardly protruding part 72a' which is received between a flange 73a' surrounding the outer free end of the coupling part 10 and a retaining ring 74a' arranged in a groove 75a' in the external wall of the coupling part 10. The second flange ring 71b' is secured on the outside of the second female coupling part 30 in engagement with the external wall thereof. The flange ring 71b' comprises an inwardly protruding part 72b' which is received between a flange 73b' surrounding the outer free end of the coupling part 30 and a retaining ring 74b' arranged in a groove 75b' in the external wall of the coupling part 30. The respective flange ring 71a', 71b' is provided with an outwardly protruding part 76a', 76b'. The securing arrangement 90 also comprises a seal retainer plate 80' received between the first flange ring 71a' and the second flange ring 71b'. The seal retainer plate 80' is provided with an annular inner recess 81' surrounding the intermediate member 24 of the male coupling part 20 and accommodating the outer edge of the bellows of said intermediate member 24. A number of bolts 91 are each arranged in a respective set of mutually aligned through holes 92a, 92b, 92c extending through the flange rings 71a', 71b' and the intermediate seal retainer plate 80' in the axial direction of the coupling parts 10, 20, 30. The flange rings 71a', 71b' and the intermediate seal retainer plate 80' are pressed against each other and secured to each other by means of these bolts 91, thereby securing the coupling parts 10, 20, 30 to each other.

Figure 9:
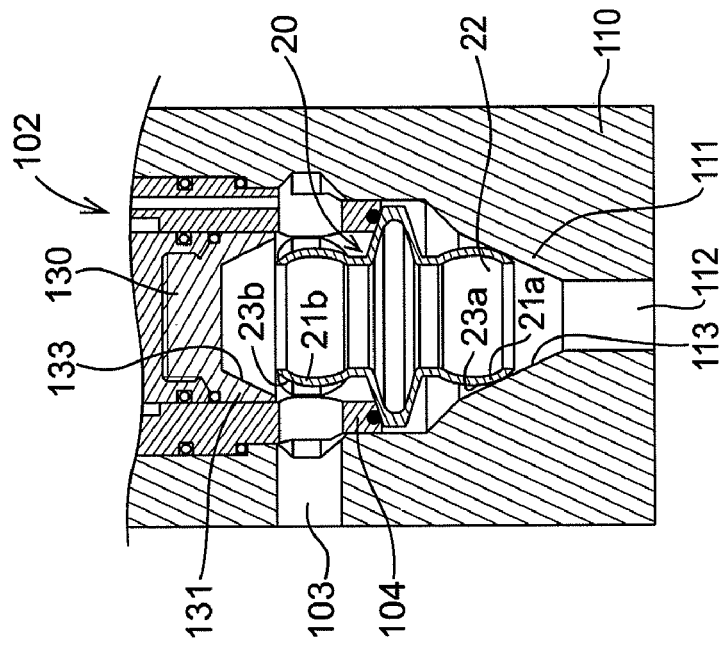
FIG. 9 is a schematical illustration of the valve device according to FIG. 8 as seen in an open state.
Figure 8:
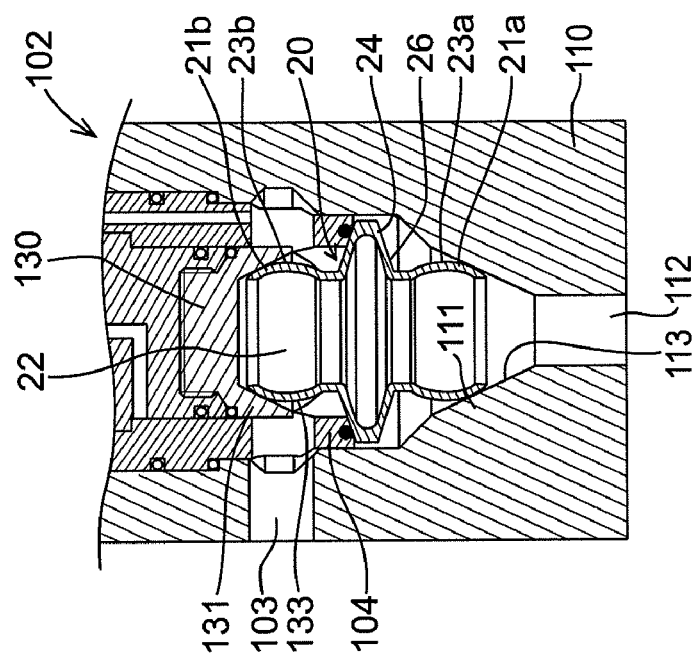
FIG. 8 is a schematical illustration of a valve device according to the invention as seen in a longitudinal section and in a closed state.

A valve device 102 according to the present invention is illustrated in FIGS. 8 and 9. This valve device comprises a first valve part 110, which is provided with a first female sealing member 111 and has an internal bore 112 extending through the valve part 110 and its female sealing member 111, and a second valve part 130, which is provided with a second female sealing member 131 facing said first female sealing member 111. The second valve part 130 is not provided with any internal bore that extends through its female sealing member 131. The valve device 102 further comprises a sealing element 20 of the type described above with reference to FIG. 1 interposed between the first female sealing member 111 and the second female sealing member 131. The sealing element 20 is consequently provided with a first male sealing member 21a at a first end thereof and a second male sealing member 21b at a second end thereof. The sealing element 20 has an internal bore 22 extending through the body 26 of the sealing element and its sealing members 21a, 21b.

The male sealing members 21a, 21b are each provided with an external spherical contact surface 23a, 23b of metallic material and the female sealing members 111, 131 are each provided with a corresponding internal conical contact surface 113, 133 of metallic material for engagement with the spherical contact surface 23a, 23b of the corresponding male sealing member 21a, 21b. The respective spherical contact surface 23a, 23b of the male sealing members 21a, 21b and the conical contact surface 113, 133 of the corresponding female sealing member 111, 131 are designed to form a fluid-tight seal between the sealing element 20 and the corresponding valve part 110, 130 when said contact surfaces 23a, 113 and 23b, 133 are pressed against each other. It is realised that the contact surfaces 23a, 23b, 113, 133 should have a suitable surface smoothness so as to allow a fluid-tight contact between said contact surfaces. The respective contact surface 23a, 23b, 113, 133 is suitably of a corrosion resistant metallic material.

In the illustrated embodiment, the first male sealing member 21a is connected to the second male sealing member 21b via an intermediate member 24 of the type described above with reference to FIG. 1, which is mechanically compressible so as to be capable to store elastic energy when the sealing element 20 is subjected to compression between the first valve part 110 and the second valve part 130. The intermediate member 24 has an internal cross-sectional area which is larger than the external cross-sectional area of the respective male sealing member 21a, 21b as seen at the point of the male sealing member where the male sealing member engages with the corresponding female sealing member 111, 131. Hereby, the intermediate member 24 is expandable in the axial direction of the sealing element 20 by an internal fluid pressure in the valve device 102, i.e. a fluid pressure inside the internal bore 22 of the sealing element, so as to urge the respective male sealing member 21a, 21b against the corresponding female sealing member 111, 131, thereby increasing the sealing contact pressure between the respective male sealing member and the corresponding female sealing member when the sealing element 20 is clamped between the first and second valve parts 110, 130.

The first valve part 110 and the second valve part 130 are displaceable in relation to each other in the axial direction of the body 26 of the sealing element 20 between a first position (see FIG. 8), in which the contact surface 23a, 23b of both male sealing members 21a, 21b is pressed against its corresponding contact surface 113, 133 of the female sealing members 111, 131, and a second position (see FIG. 9), in which the contact surface 23a, 23b of at least one of the male sealing members 21a, 21b Is out of engagement with its corresponding contact surface 113, 133 of the female sealing members 111, 131. In the illustrated embodiment, the first valve part 110 is designed as a valve housing accommodating the second valve part 130. The second valve part 130 is here slidably mounted in said valve housing so as to allow the second female sealing member 131 to be displaced together with the second valve part 130 towards and away from the first female sealing member 111.

The sealing element 20 may be fixed in position in relation to the first valve part 110 in such a manner that the contact surface 23a of the first male sealing member 21a is maintained in contact with the corresponding contact surface 113 of the first female sealing member 111 irrespective of the mutual axial position between the first and second valve parts 110, 130. In the illustrated embodiment, the sealing element 20 is secured to the first valve part 110 by means of a retaining member 104. In this case, the contact surface 23b of the second male sealing member 21b is out of engagement with the corresponding contact surface 133 of the second female sealing member 131, whereas the contact surface 23a of the first male sealing member 21a is in engagement with the corresponding contact surface 113 of the first female sealing member 111, when the first and second valve parts 110, 130 are in said second position.

The valve device 102 is provided with a flow channel 103, which is connected to the internal bore 112 of the first valve part 110 via the space between the first female sealing member 111 and the second female sealing member 131. Fluid flow between said flow channel 103 and the internal bore 112 of the first valve part is obstructed when the first and second valve parts 110, 130 are in said first position (see FIG. 8), whereas fluid flow between said flow channel 103 and the internal bore 112 of the first valve part is allowed when the first and second valve parts 110, 130 are in said second position (see FIG. 9). Consequently, the flow channel 103 is in fluid communication with the internal bore 112 of the first valve part via the internal bore 22 of the sealing element and the space between the second male sealing member 21b and the second female sealing member 131 when the first and second valve parts 110, 130 are in said second position, which constitutes the open state of the valve device. The flow channel 103 is not in fluid communication with the internal bore 112 of the first valve part when the first and second valve parts 110, 130 are in said first position, which constitutes the closed state of the valve device. In this closed state, the internal bores 112, 22 of the first valve part and the sealing element will be sealed from the flow channel 103 by the seal formed between the respective pair of sealing members.

The valve device 102 of the present invention is suitable for use as a subsea valve, e.g. in the form of a subsea ROV operated isolation valve to be applied as part of a subsea manifold production system or of a single or cluster subsea production tree system. It should, however, be evident to a person skilled in the art that the valve device according to the present invention may be used for many other purposes.

The invention is of course not in any way restricted to the preferred embodiments described above. On the contrary, many possibilities to modifications thereof will be apparent to a person with ordinary skill in the art without departing from the basic idea of the invention such as defined in the appended claims.

The invention claimed is:

1. A hydraulic coupling device, comprising:
   a male coupling part in the form of a sealing element comprising a hollow body of metallic material with a first male sealing member formed at a first end of the body and a second male sealing member formed at a second end of the body opposite said first end, the body further comprising an intermediate member that forms a continuous part together with the first male sealing member and the second male sealing member and that is mechanically compressible so as to be capable of storing elastic energy when the body is subjected to axial compression, wherein an internal bore extends through the body and through the first and second male sealing members and the intermediate member;
   a first female coupling part comprising a first female sealing member and having an internal bore extending through the coupling part and its female sealing member; and
   a second female coupling part comprising a second female sealing member,
   wherein the first male sealing member has an external spherical contact surface surrounding said internal bore of said male coupling part and designed for mating with a corresponding internal conical contact surface of the first female sealing member so as to form a fluid-tight seal between the first male sealing member and the first female sealing member when their contact surfaces are pressed against each other;
   wherein the second male sealing member has an external spherical contact surface surrounding said internal bore of said male coupling part and designed for mating with a corresponding internal conical contact surface of the second female sealing member so as to form a fluid-tight seal between the second male sealing member and the second female sealing member when their contact surfaces are pressed against each other,
   wherein at least one of the first and second female coupling parts comprises a valve, which comprises a valve body displaceably arranged inside the internal bore of the female coupling part and a spring member acting on the valve body, the valve body being displaceable against the action of the spring member from a first position, in which the valve is closed and prevents fluid flow through the internal bore of the female coupling part, to a second position, in which the valve is open and allows fluid flow through the internal bore of the female coupling part; and
   wherein the male coupling part comprises an actuation member for displacing the valve body from said first position to said second position immediately before the female sealing member of the female coupling part is brought into engagement with the corresponding male sealing member of the male coupling part.

2. The hydraulic coupling device according to claim 1, wherein the first male sealing member is coaxial with the second male sealing member.

3. The hydraulic coupling device according to claim 1, wherein the intermediate member is expandable by an internal fluid pressure in the body so as to urge the respective male sealing member outwards in the axial direction of the body against the corresponding female sealing member when the sealing element is fitted between said female sealing members, thereby increasing the sealing contact pressure between the respective male sealing member and the corresponding female sealing member.

4. The hydraulic coupling device according to claim 1, wherein the intermediate member has an internal cross-sectional area which is larger than the external cross-sectional area of the respective male sealing member as seen at the point of the male sealing member where the male sealing member is designed to engage with the corresponding female sealing member.

5. The hydraulic coupling device according to claim 1, wherein the second female coupling part has an internal bore extending through the coupling part and its female sealing member.

6. The hydraulic coupling device according to claim 1, wherein the second female coupling part is designed as a stop member adapted to close the internal bore of the male coupling part when the male coupling part is clamped between the first and second female coupling parts.

7. The hydraulic coupling device according to claim 1, wherein:
   the valve comprises a housing which is immovably fixed inside the internal bore of the female coupling part, said housing comprising a cavity accommodating the spring member and a part of the valve body; and
   wherein said cavity is in fluid communication with an orifice at the end of the valve facing the free end of the female sealing member of the female coupling part so as to allow the cavity to be in fluid communication with the surroundings via said orifice when the female coupling part is out of engagement with the male coupling part.

8. The hydraulic coupling device according to claim 7, wherein the actuation member is adapted to restrict the flow through the orifice when the female sealing member is in engagement with the corresponding male sealing member.

9. The hydraulic coupling device according to claim 7, wherein the cavity is in fluid communication with the orifice via a channel extending through the valve body.

10. The hydraulic coupling device according to claim 9, wherein said channel extends axially through the valve body.

11. The hydraulic coupling device according to claim 9, wherein the actuation member is adapted to engage with the valve body so as to cover the orifice and thereby restrict the flow through the orifice when the female sealing member is in engagement with the corresponding male sealing member.

12. The hydraulic coupling device according to claim 1, wherein:
the valve comprises a ring-shaped seal element arranged in an annular groove, which groove is provided in the inner wall of the internal bore of the female coupling part; and
an external surface of the valve body is adapted to engage with the ring-shaped seal element so as to form a fluid-tight seal between the inner wall of the internal bore and the valve body when the valve body is in said first position.

13. The hydraulic coupling device according to claim 1, wherein:
the valve body comprises a first body part and a second body part, said first body part being located in front of the second body part as seen in a direction along the associated internal bore towards the associated female sealing member;
a first flow path section is provided radially outwardly of the first body part between the valve housing and the inner wall of the internal bore, and a second flow path section is provided between the second body part and said inner wall, said first and second flow path sections extending essentially in the axial direction of the internal bore on mutually different levels as seen in the radial direction of the internal bore;
the first flow path section is connected to the second flow path section via an intermediate flow path section extending obliquely in relation to the first and second flow path sections; and
the first body part is adapted to block the intermediate flow path section when the valve body is displaced from said second position to said first position.

14. The hydraulic coupling device according to claim 13, wherein the second body part has a smaller cross-sectional area than the first body part, wherein the second body part is surrounded by the ring-shaped seal element and out of engagement therewith when the valve body is in said second position, wherein an external surface of the first body part is adapted to be brought into engagement with the ring-shaped seal element so as to form a fluid-tight seal between the inner wall of the internal bore and the valve body when the valve body is displaced from said second position to said first position, and wherein the end of the first body part facing the second body part only has blunt edges so that the ring-shaped seal element will meet no sharp edge when the valve body is displaced between said positions.

15. The hydraulic coupling device according to claim 13, wherein the intermediate flow path section is defined partly by an external surface of the valve body which extends obliquely, as seen in the axial direction of the valve body, between the first body part and the second body part.

16. A hydraulic coupling device, comprising:
a male coupling part in the form of a sealing element comprising a hollow body of metallic material with a first male sealing member formed at a first end of the body and a second male sealing member formed at a second end of the body opposite said first end, the body further comprising an intermediate member that forms a continuous part together with the first male sealing member and the second male sealing member and that is mechanically compressible so as to be capable of storing elastic energy when the body is subjected to axial compression, wherein an internal bore extends through the body and through the first and second male sealing members and the intermediate member;
a first female coupling part comprising a first female sealing member and having an internal bore extending through the coupling part and its female sealing member; and
a second female coupling part comprising a second female sealing member,
wherein the first male sealing member has an external spherical contact surface surrounding said internal bore of said male coupling part and designed for mating with a corresponding internal conical contact surface of the first female sealing member so as to form a fluid-tight seal between the first male sealing member and the first female sealing member when their contact surfaces are pressed against each other;
wherein the second male sealing member has an external spherical contact surface surrounding said internal bore of said male coupling part and designed for mating with a corresponding internal conical contact surface of the second female sealing member so as to form a fluid-tight seal between the second male sealing member and the second female sealing member when their contact surfaces are pressed against each other, and
wherein the second female coupling part is designed as a stop member adapted to close the internal bore of the male coupling part when the male coupling part is clamped between the first and second female coupling part.

* * * * *